Dec. 26, 1967   M. J. PARISI ET AL   3,359,995
AUTOMATIC THREE-WAY VALVE
Filed July 2, 1965
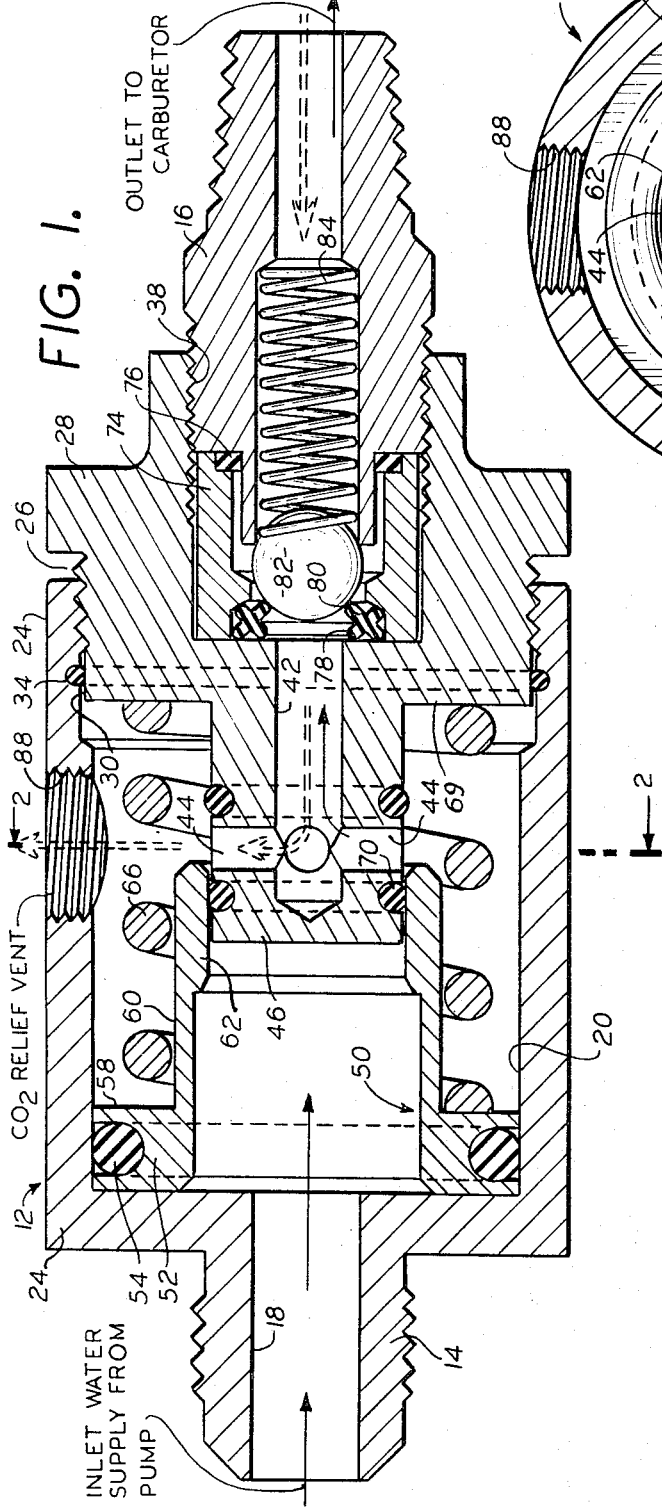
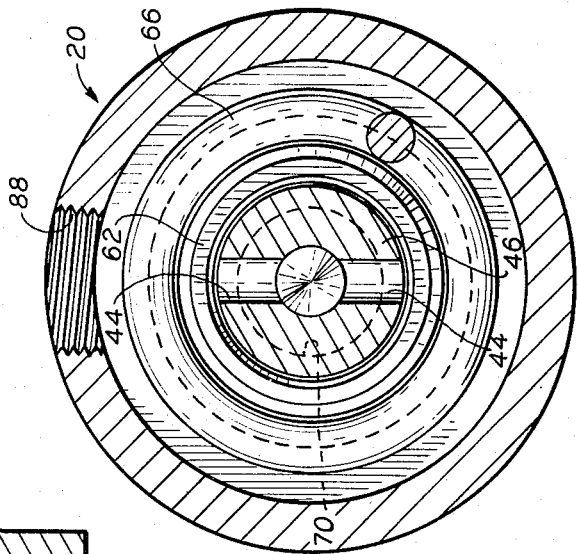
INVENTORS
Michael J. Parisi
Thomas Migliore
BY
Sandoe, Hopgood,
Schrotter & Wikstrom
ATTORNEYS.

United States Patent Office 3,359,995
Patented Dec. 26, 1967

3,359,995
AUTOMATIC THREE-WAY VALVE
Michael J. Parisi, Paramus, N.J., and Thomas Migliore, New York, N.Y., assignors to Tap-Rite Products Corp., Hackensack, N.J., a corporation of New Jersey
Filed July 2, 1965, Ser. No. 469,164
11 Claims. (Cl. 137—102)

This invention relates to valves and more especially to an automatic, three-way valve and to a combination of such a valve with a check valve to protect a fluid supply line from back flow of fluid in the event that the check valve leaks when in closed position.

It is an object of the invention to provide an improved valve, of the character indicated, and to provide means for venting a fluid line upstream of a check valve if the check valve fails to withstand the back pressure in the line.

Another object is to provide a safety check valve assembly with an automatically-operated valve element for preventing back flow if the check valve leaks.

Other objects, features and advantages of the invention will appear or be pointed out as the description proceeds.

In the drawing, forming a part hereof, in which like reference characters indicate corresponding parts in all the views:

FIGURE 1 is a sectional view through a check valve assembly made in accordance with this invention; and FIGURE 2 is a sectional view on the line 2—2 of FIGURE 1.

The invention includes an automatic three-way valve comprising a housing 12 having a fitting 14 at one end and a fitting 16 at the other. The fitting 14 has an inlet passage 18 communicating with a cylindrical valve chamber 20 within the housing 12. There is an outlet passage 22 extending through the fitting 16.

The housing 12 includes a shell 24 which screws over threads 26 on a housing part 28. An O-ring 30, located in a circumferential groove in the shell 24, bears against a cylindrical surface on the inside of the housing part 28 to provide a seal to prevent leakage of fluid from within the housing along the threads 26.

The fitting 14 is preferably integral with the shell 24, but the fitting 16 screws into a counterbore 38 in the housing part 28, there being threads along a portion of the length of the counterbore 38 for receiving threads of the outlet fitting. The housing part 28 has a passage 42, which is preferably in line with the outlet passage; and this passage 42 has four branch passages 44 extending through the circumference of an inner end portion 46 of the housing part 28.

A valve element 50 is located in the cylindrical valve chamber 20. At its left-hand end 52, the valve element 50 has a diameter substantially equal to the inside diameter of the valve chamber 20 and this left-hand end 52 slides in the valve chamber 20 as a piston. In the preferred construction there is a piston ring 54 consisting of an O-ring located in a circumferential channel in the left-hand end of the valve element 50 and in position to contact the inside wall of the valve chamber 20.

The valve element 50 has a shoulder 58 at which the diameter of the valve element decreases to form a sleeve portion 60 of the valve element; and the sleeve portion 60 has a thickened end 62 which is of the same outside diameter as the sleeve portion 60 but an inside diameter substantially less than that of the sleeve portion 60. A helical compression spring 66 is compressed between the shoulder 58 and a confronting shoulder 69 on the housing part 28. This spring 66 urges the valve element 50 toward the left-hand end of its stroke, a position in which the valve element abuts against the end wall of the valve chamber 20.

The thickened end 62 of the sleeve portion 60 has a cylindrical inside surface which fits over the inner end portion 46 of the housing part 28 with a sliding fit. Thus there is relative movement of the inner end portion 46 and the thickened end 62 of the sleeve portion 60 corresponding to that of a piston in a cylinder. There are two sealing rings 70, preferably O-rings, located in circumferential grooves in the inner end portion 46 on opposite sides of the branch passages 44.

In the left-hand end of the counterbore 38, there is a bushing 74 clamped against the end of the counterbore 38 by the fitting 16 and with a sealing ring or gasket 76 covering a part of the confronting faces of the bushing 74 and fitting 16 to prevent leakage.

The left-hand end of the bushing 74 is undercut to hold a quad ring 78. The undercut of the bushing 74 has an axial length substantially less than the undistorted axial dimension of the quad ring 78 so that when the bushing 74 is pushed into contact with the end of the counterbore 38, the quad ring is firmly clamped in the position shown in FIGURE 1. One leg 80 of the quad ring 78 extends inwardly at an angle to form a seat for a ball check valve 82. This ball check valve 82 is urged into contact with the seat 80 by a compression spring 84 located in a counterbore at the upstream end of the outlet passage 22.

When there is no pressure in the inlet passage 18, or when the pressure in the inlet passage is substantially below the intended pressure, the valve element 50 is held, by the spring 66, in the position shown in FIGURE 1 and any fluid which leaks back from the outlet passage past the check valve 82 escapes through the passage 42, branch passages 44, valve chamber 20 and vent opening 88 through the wall of the housing 12. If the escaping fluid is a gas, such as carbon dioxide, then the vent passage 88 can open directly into the atmosphere. If the passage provided by the vent opening 88 is for the escape of liquid, or some inflammable or toxic gas, then a discharge tube is connected with the vent opening 88 and threads are provided in the vent opening for a fitting to connect such a tube with the housing 12.

The force of the spring 66 can be adjusted by screwing the housing part 28 further into the shell 24 along the threads 26. This provides a fine adjustment of the pressure. For greater adjustments, a spring of different strength from the spring 66 is inserted in the housing and the pressure of the substitute spring is controlled by moving the housing part 28 one way or another along its threaded connection with the shell 24.

With the parts in the position shown in FIGURE 1, there can be no flow of fluid from the passage 42 into the passage 18 because the left-hand O-ring 70 seals the clearance between the end portion 46 and the valve element 50 while the O-ring 54 seals the clearance between the inside wall of the valve chamber 50 and the left-hand end 52 of the valve element 50.

When fluid under normal pressure is supplied to the inlet passage 18, the pressure of the fluid moves the valve element 50 toward the right in FIGURE 1 and causes the thickened end 62 of the sleeve portion 60 to move toward the right across the branch passage 44 and across the right-hand O-ring 70. This seals off the vent passage 88 from the branch passages 44. Further movement of the valve element 50 toward the right brings the thickened end 62 beyond the left-hand O-ring 70 so that the full inside diameter of the sleeve portion 60 provides a clearance around the left-hand O-ring 70 and fluid from the inlet passage 18 flows through this clearance and into the branch passages 44 leading to the passage 42. This flow of fluid under pressure displaces the check valve 82 from the seat 80 and continues the flow of fluid through the outlet passage.

When flow is stopped by shutting off the supply of fluid to the inlet passage 18, the check valve 82 is closed by the spring 84 and there is no back flow from the outlet passage 22 into the passage 42 unless the check valve 82 leaks. The shutting off of the fluid supply to the inlet passage 18 permits the spring 66 to push the valve element back into its original position, shown in FIGURE 1.

From the foregoing description it will be apparent that the apparatus described provides an automatic three-way valve through which fluid flows from an inlet passage to an outlet passage during normal operation of the valve, but in which the valve element moves automatically into position to open a vent for the escape of back flow of fluid from the outlet passage when the flow of fluid to the inlet passage is discontinued.

The combining of this three-way valve with a check valve for preventing the back flow provides a combination in which a line is protected against back flow by a check valve, but provision is made for the escape of any leakage past the check valve so that in no event can back flow reach an inlet supply passage.

The invention is used on fluid supply lines leading to a mixer where carbon dioxide or other fluid may be mixed with water coming from the fluid supply line. In such installations, it is essential to protect against accidental back flow of the gas-charged water into the water supply pipe and the water mains to which the supply pipe is connected.

The preferred embodiment of the invention has been illustrated and described, but changes and modifications can be made and some features can be used in different combinations without departing from the invention as defined in the claims.

What is claimed is:

1. A fluid flow control system including a housing having a chamber therein, inlet and outlet passages opening through the housing and into said chamber at different locations on the housing, a vent passage at a third location on the housing and through which fluid escapes from within the chamber, a piston that slides in the chamber and that as an axially-extending bore, a guide element fixed relative to the housing and extending from one end of the chamber and into the axial bore of the piston, at least one of the passages opening through the circumference of the guide element and being closed by the piston when the piston covers one of said passages at one part of its stroke.

2. The fluid flow control system described in claim 1 characterized by the guide having sealing elements axially spaced from the passage through the circumference of the guide and sealing the clearance between the confronting faces of the guide and the piston bore.

3. The fluid flow control system described in claim 2 characterized by the end of the guide within the piston bore being imperforate and the bore of the piston constituting a part of an opening that extends throughout the full axial length of the piston.

4. The fluid flow control system described in claim 3 characterized by the opening through the piston being of larger cross section beyond the bore and having a part that overlaps the passage, which opens through the circumference of the guide, when the piston is at another part of its stroke.

5. The fluid flow control system described in claim 4 characterized by one of the passages being at one end of the housing and opposite to that end of the piston that is remote from the guide and from the bore of the piston that slides on the guide.

6. The fluid flow control system described in claim 5 characterized by the vent passage opening through a side of the housing at a location beyond the end of the stroke of the piston and at the end of the housing nearest to the bore of the piston that slides on the guide.

7. The fluid flow control system described in claim 6 characterized by the passage that opens through the circumference of the guide being an extension of a passage which extends axially through the guide in a direction away from the piston, a seat at a location along said extension of the passage, and a check valve in position to close to stop flow toward the passage that opens through the circumference of the guide.

8. The fluid flow control system described in claim 7 characterized by a spring urging the check valve into closed position against the seat, and another spring in the housing urging the piston toward the end of the housing remote from the guide.

9. A fluid flow control system including a housing, a main valve element within the housing and movable through a stroke, an inlet passage through one end of the housing, an outlet passage through the other end of the housing, a check valve in series with the outlet passage and oriented to prevent back flow of fluid through the outlet passage toward the housing, a vent passage opening through the wall of the housing in position to vent any fluid that leaks back past the check valve when the main valve element is in a first position, the main valve element having clearance for communication between the inlet and outlet passages when said main valve element is in a second position, and sealing means that stop flow of liquid to the vent when the main valve element is in said second position.

10. The fluid flow control system described in claim 9 characterized by a spring urging the main valve element toward said second position when any pressure on the main valve element from the inlet passage is below a given value.

11. The fluid flow control system described in claim 10 characterized by means for adjusting the pressure of the spring that moves the piston to change the pressure at which the spring overcomes the force of fluid from the inlet passage.

References Cited

UNITED STATES PATENTS

| 2,474,122 | 6/1949 | Schneck | 137—102 X |
| 2,488,949 | 11/1949 | Walsh | 137—102 X |
| 2,706,487 | 4/1955 | Wilson | 137—102 |
| 2,722,402 | 11/1955 | Crookston | 137—102 X |
| 3,042,061 | 7/1962 | Dobrikin | 137—102 |

WILLIAM F. O'DEA, *Primary Examiner.*

W. H. WRIGHT, *Assistant Examiner.*